United States Patent [19]
Ryu

[11] Patent Number: 6,068,882
[45] Date of Patent: May 30, 2000

[54] FLEXIBLE AEROGEL SUPERINSULATION AND ITS MANUFACTURE

[75] Inventor: Jaesoek Ryu, San Diego, Calif.

[73] Assignee: Aspen Systems, Inc., Marlborough, Mass.

[21] Appl. No.: 09/056,413

[22] Filed: Apr. 7, 1998

Related U.S. Application Data

[63] Continuation-in-part of application No. 08/554,930, Nov. 9, 1995, abandoned.

[51] Int. Cl.[7] ........................................... B05D 5/00
[52] U.S. Cl. ........................... 427/246; 427/301; 427/373; 427/374.1; 427/377; 427/397.7; 427/403; 427/404
[58] Field of Search ..................................... 427/246, 301, 427/373, 374.1, 377, 397.7, 403, 404

[56] References Cited

U.S. PATENT DOCUMENTS 5,306,555  4/1994  Ramamurthi et al. .................. 428/289

*Primary Examiner*—Christopher Raimund
*Attorney, Agent, or Firm*—Bruce F. Jacobs

[57] ABSTRACT

A thermal insulation is produced by forming aerogels interstitially within a fiber matrix. The resulting composite structures have substantially no fiber—fiber contacts. The insulating product is made by impregnating the fiber matrix with an aerogel forming precursor and supercritically drying the aerogel precursor under pressure. Drying is conducted prior to aging of the aerogel precursor.

25 Claims, 1 Drawing Sheet

FLEXIBLE AEROGEL SUPERINSULATION AND ITS MANUFACTURE

CROSS REFERENCE TO RELATED APPLICATION

This application is a continuation-in-part of U.S. Ser. No. 08/554,930 filed Nov. 9, 1995, now abandoned.

BACKGROUND OF THE INVENTION

The present invention relates to an aerogel composite blanket insulation product which is useful as a thermal protection system in environments which contain one or more solid conductive, gaseous convective, and/or radiative heat transfer components. In particular, the composite blanket insulation contains extremely low density aerogels formed amongst the interstices of a fibrous blanket matrix. The low density aerogels within the composite blanket insulation greatly improve the thermal conductivity performance of the fiber blanket insulation, i.e. reduces the thermal conductivity thereof. The aerogel composite insulation exhibits greatly improved thermal performance (lower thermal conductivity) by means of a combination of (a) reduced solid conduction by establishing a heat conduction path through the ultra-low thermal conductivity aerogels, (b) reduced gas molecular conduction through a suppresing gas convection utilizing the fine pore sizes of the aerogels, and (c) preferably certain modifications of the surface of the fiber materials to reduce infrared penetration through the fiber blanket.

Currently, highly evacuated multilayer insulation (MLI) and evacuated powder insulation are the most widely used insulation systems for cryogenic applications. Multilayer insulation is currently the most effective cryogenic insulation system when used under high vacuum. However, because of the highly anisotropic nature of MLI, its use on actual systems requires careful attention during installation and oftentimes causes awkward structural complexities. Furthermore, MLI is very expensive, bulky, heavy, and also requires the presence of a high vacuum state ($10^{-4}$ Torr or better) to realize its full potential.

Evacuated aerogel powder insulation is approximately one order of magnitude less effective than MLI but is isotropic and generally easier to handle. It requires only a moderate vacuum ($10^{-2}$ or $10^{-3}$ Torr). A major drawback to any powder insulation, however, is the tendency of a powder to settle over time and thereby form voids, particularly when the insulation is subject to vibration or thermal cycling. The settling can result in heat leakage in those areas where the voids have formed in the insulation.

Therefore, there has been a constant demand for cost effective easy-to-handle insulation systems, both for cryogenic and high temperature applications. Particularly desirable is an effective insulation suitable for use over irregular shaped components such as valves, pipe joints, penetrations, and the like. Recent advances have resulted in the development of ultra-low density aerogels. The highly porous structure of these aerogels results in a reduction in solid conductivity as compared to the powdered aerogels currently in use. While powdered aerogels can conform to the shape of any insulation space, they are limited in application and can be messy, especially when maintenance is required. Thus, while a powdered ultralow density aerogel can be tailored to meet the geometries of complex shapes, the products still suffer from the old problems of settling and void formation.

Aerogels have also been produced in monolith form. Although monolithic aerogels have been considered excellent candidates for window materials due to a relatively high thermal resistance and optical transparence, the monolithic materials have been rigid and fragile. The monolith aerogels are extremely difficult to handle and cannot easily be used to insulate complex shaped bodies.

Recent advances in fibrous materials has produced organic and inorganic fibers useful as thermal insulations over a wide range of temperatures. The fibrous insulations offer the benefits of flexibility, both at room and cryogenic temperatures and ease of installation. However, the thermal conductivity of these new materials has been only in the order of 0.005 W/m° K. (R=28.8/inch) and 0.03 W/m° K. (R=4.8/inch) for samples tested in vacuum and air, respectively. Since these fibrous products possess only a relatively moderate thermal conductivity, they exhibit limited insulating performance, particularly at extreme temperatures.

Several documents have disclosed the general formation of aerogels in the presence of fibers and other such materials. For example, U.S. Pat. No. 4,629,652 (Carlson et al) discloses forming pelletized aerogel products within a variety of support structures ranging from vermiculite to distillation rings. The aerogels cling tenaciously to the supporting structures and result in the production of "pellettized" aerogels. U.S. Pat. No. 5,306,555 (Ramamurthi et al) discloses preparing aerogel matrix monolith composites by mixing aerogel precursors with fibers, aging the fiber-containing aerogel precursor to obtain a gelled composition, supercritical drying the fiber-gel composition, and rapidly releasing the pressure from the supercritical temperature and pressure conditions. The resulting monolith structures are reported to have thermal conductivities of only about 0.018 to 0.021 W/m° K. and thus R values of only about 6.8–8/inch in vacuum. The products of the present invention exhibit substantially superior performance characteristics for the same metal oxide.

The prior art fails to suggest impregnating a fibrous structure with an aerogel precursor such that the precursor forms a liquid phase around each fiber and then immediately supercritically drying the precursor solution to form aerogels distributed throughout the fibrous matrix such that essentially no fiber—fiber contacts remain (as determined by scanning electron microscopy examination). Moreover, the prior art does not suggest pre-treating a fiber matrix to enhance the attraction between the aerogels and the fibers of the matrix as well as to reduce thermal conduction through the resulting composite insulation in some cases. Furthermore, the maximum reported R value for low temperature aerogel powder products is about 140/inch and for low temperature aerogel monolithic products about 20/inch, both in high vacuums of less than about $10^{-5}$ Torr. Thus the prior art fails to suggest techniques for increasing these R values to the more than 300 obtained with the low temperature aerogel products of the present invention.

It has now been discovered that the performance of a fiber-reinforced aeroqel product may be improved by minimizing free gas molecular conduction and convection and by substantially precluding point contacts between fibers.

Accordingly, it is an object of the present invention to produce an aerogel-fiber composite product having superior insulation performance characteristics as compared to currently existing aerogel insulation materials or fiber blankets.

It is a further object to produce a flexible superinsulation composite product in an easy-to-use configuration by interstitially forming low thermal conductivity aerogels within a fibrous matrix.

It is a still further object to produce a flexible insulation product wherein there are no fiber—fiber contacts.

It is a still further object to enhance the interfacial attraction between aerogels and fibers.

It is a still further object to minimize infrared penetration through the composite insulation.

These and still other objects will be apparent from the following disclosure of the present invention.

SUMMARY OF THE INVENTION

The present invention is directed to an improved insulation material comprising aerogels interstitially formed within a low density fiber matrix. More specifically, the present invention is directed to an aerogel-filled fibrous matrix with substantially no fiber—fiber contacts within the fibrous matrix which would permit solid heat transfer through the aerogels. Moreover, the structures of this invention overcome the handling problems of aerogel powders while simultaneously reducing the heat transfer rate through fibrous materials to a far greater extent than has previously been reported with aerogels. The presence of the closely packed aerogels substantially completely eliminates open spaces in the insulation and suppresses gas conduction heat transfer and is believed to result in the improved thermal resistance which is achieved in both evacuated and non-evacuated systems by the present invention. Highly flexible composite structures may be produced.

Preferably, the fibers of the fiber matrix are pre-treated to enhance adhesion of the aerogels to them and to be infrared (IR) opaque and/or reflective before being soaked in the aerogel precursor. By pre-coating the fibers hereof with molecular sieve carbon or a metal prior to incorporation of the aerogels, significant improvement in performance can be obtained as well as inhibition of radiation heat transfer.

More particularly, the present invention produces low temperature aerogel insulation products having R values of greater than about 300/inch in a vaccuum of less than $2 \times 10^{-5}$ Torr, preferably greater than about 500/inch, as determined using a warm surface temperature of 280° K. and a cold surface temperature of 77° K. In addition, the present invention produces high temperature aerogel insulation products which are superior to those previously reported.

DETAILED DESCRIPTION OF THE PREFERRED EMBODIMENTS

The present invention is directed to improved aerogel-based insulation products having enhanced R values (and reduced thermal conductivities) as compared to prior aerogel insulation products.

Specifically, at high vacuum (less than $2 \times 10^{-5}$ Torr), the low temperature aerogel composite products of this invention exhibit R values of greater than about 300/inch, preferably greater than about 500/inch, and more preferably greater than about 600/inch and up to 1,000 and higher. Optimization of the composite aerogel insulations of this invention is expected to yield R values as high as 1,500/inch and even higher at high vacuum. All of the R values are based upon testing in a vacuum of less than $2 \times 10^{-5}$ Torr with a hot surface temperature of 280° K. and a cold surface temperature of 77° K.

High temperature insulation products are normally evaluated in air, rather than in vacuum. Since thermal conductivity and R values are substantially dependent upon the test atmosphere and temperature conditions, the high temperature insulation products of this invention exhibit much lower values thereof.

Figure 1A:
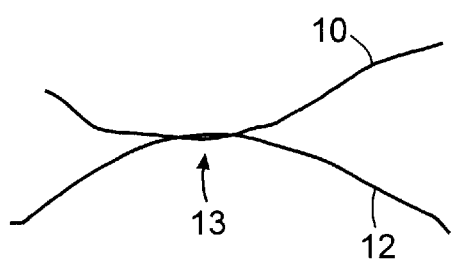
FIG. 1a is a schematic view of a conventional (prior art) fiber insulation.
Figure 1B:
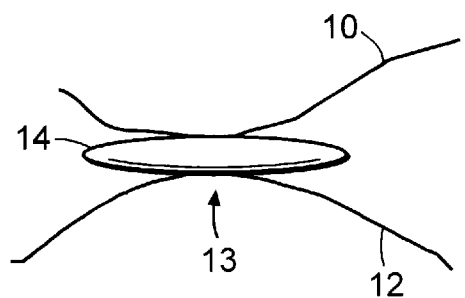
FIG. 1b it a schematic view of an insulation of the present invention.

Referring to the drawings, FIG. 1a is a schematic view of a conventional (prior art) fiber insulation and FIG. 1b is a schematic view of an insulation of the present invention. The mechanism of heat transfer in conventional fiber insulation in vacuum involves solid conduction through direct fiber—fiber contacts from fiber 10 to fiber 12. Free gas molecular conduction is also a significant factor in heat transfer through this type of fiber insulation in air. As shown in FIG. 1b, the placement of aerogels at the point of contact 13 between fiber 10 and fiber 12 in the present invention results in all solid conduction heat transfer occurring through the inherently low solid thermal conductivity aerogel 14. Furthermore, since the open structures in the fibrous matrix are filled with aerogels, the structure greatly suppresses free gas molecular heat transfer.

The improved aerogel insulation of the present invention is prepared by impregnating a fibrous matrix with an aerogel precursor solution so that a liquid phase is placed around every fiber and then, without aging of the precursor solution to form a gel, supercritically drying the impregnated matrix under conditions such that substantially no fiber—fiber contacts are present as determined by scanning electron microscopic examination of the insulation. The insulation contains aerogels distributed uniformly throughout the fibrous matrix. The aerogel/fibrous matrix composite structures of the present invention are produced via the wet chemistry techniques which are discussed in detail below.

The fibrous matrix is a critical element of the present invention. The matrix provides a support base to carry the aerogels. Generally, the matrix is flexible so that the composite insulation product will be flexible. In addition, the fibrous matrix provides load carrying capability. Optionally, the matrix is pre-shaped to define a shape of a still flexible but more rigid aerogel insulation product. The materials suitable for use in forming the fibrous matrix will preferably (1) have adequate temperature and thermal shock resistance, the specific temperature depending upon the environment of the intended use; (2) be chemically non-reactive with any of the aerogel precursors and reactants used; (3) be capable of maintaining structural integrity during supercritical drying process; (4) have a low bulk density, i.e. less than about 0.15, preferably less than about 0.07, g/cc; (5) exhibit thermomechanical compatibility with the other components; and (6) be available in the form of a blanket or felt in large quantifies at relatively low cost or capable of being formed into such a blanket or felt. More preferably, the fibrous matrix has a high inherent infra-red opaqueness.

Examples of fibrous materials generally meeting these features include alumina, silica, silica-alumina, silicon carbide, silicon nitride, zirconia, and the like. If desired, combinations of fibrous materials may be used, e.g. a layer of silicon carbide for structural support as an outer skin atop a less resistant material. Specific examples of some currently commercially available preferred fibrous products useful as matrices and some relevant characteristics thereof are listed in Table I.

TABLE I

CURRENTLY PREFERRED FIBROUS MATRIX MATERIALS

| PRODUCT NAME | Refractory Fibers | Q-Fiber | Duraback | Nicalon |
|---|---|---|---|---|
| MANUFACTURER | Tenmat, Inc. | Schuller International | Carborundum | Dow Corning |
| MAJOR COMPONENT | Alumina | Silica | Silica-alumina | Silicon Carbide |
| MAX. TEMP. ° C. (° F.) | 1,600 (2,900) | 1,000 (1,800) | 1,000 (1,800) | 1,800 (3,300) |
| THERMAL CONDUCTIVITY (Btu-in/hr-ft$^2$ ° F.) | 1.8 at 1200° C. | 0.68 at 540° C. | 1.12 at | N/A 540° C. |

In the present invention, a fiber matrix is selected after considering the aforementioned requirements and the intended temperature of use. For example, for low temperature applications, i.e. for use below about 600° C., including cryogenic applications, alumina and silica-based fiber matrices are preferred. These materials are compatible to the processing conditions of low temperature aerogels such as silica and magnesia. For high temperature applications, i.e. above about 600° C., silica containing matrices are not stable and high temperature resistant fibers such as silicon carbide and zirconia are preferred for use with compatible aerogels of oxides such as zirconia and yttria.

As seen in Table I, Q-Fiber® silica blanket has the lowest thermal conductivity of the preferred fibrous materials, and thus it is especially preferred for low temperature applications. When zirconia aerogels are used in high temperature insulations, however, the Q-Fiber® silica blanket cannot be used because it reacts with zirconia aerogel precursors. Thus, Tenmat® refractory alumina fibers and Duraback® silica-alumina fibers are preferred for use with zirconia aerogels.

To fully obtain the benefit of the composite configuration illustrated in FIG. 1b, each fiber within the fibrous matrix is completely surrounded by aerogels such that all fiber—fiber direct contact is avoided. While scanning electron microscopic examination of representative composite samples of this invention have shown no fiber—fiber contacts, it is possible that some fiber—fiber contacts may remain. Such contacts are absent for the purposes of the present invention when so few are present that the resultant aerogel composite insulation exhibits a lower thermal conductivity and an increased R value as compared to previously reported aerogel products. More specifically, the low temperature insulation products of this invention, when evaluated at high vacuum (less than $2 \times 10^{-5}$ Torr) and using a 280° K. warm surface temperature and a 77° K. cold surface temperature, exhibit R values of greater than about 300, preferably greater than about 500, more preferably greater than about 600, and even 1,000 and higher.

The substantial absence of fiber—fiber contacts is accomplished by a combination of (i) selection of compatible fibrous matrices and aerogels, (ii) impregnation of the fibrous matrix with an aerogel sol so that the liquid phase surrounds every fiber, and (iii) controlled aerogel processing procedures. A sufficiently low amount of fiber—fiber contacts exists to produce the specified R-values in the flexible monolithic products. Furthermore, pre-treating the surfaces of the fibers of the fibrous matrix to render them more IR opaque or reflective has been found helpful to enhance the adhesion of the aerogels to the fibrous matrix and, at times, to enhance the thermal performance of the insulation products.

In the process of the present invention, the principal synthetic route for the formation of aerogels is the hydrolysis and condensation of an alkoxide. Major variables in the aerogel formation process are the type of alkoxide, solution pH, and alkoxide/alcohol/water ratio. Control of these variables permits control of the growth and aggregation of the aerogel species throughout the transition from the "sol" state to the "gel" state during drying at supercritical conditions. Suitable metal alkoxides are those having about 1 to 6 carbon atoms, preferably about 2 to 4 carbon atoms, within each alkyl group. specific examples of such compounds include tetraethoxysilane (TEOS), tetramethoxysilane (TMOS), tetra-n-propoxysilane, aluminum isopropoxide, aluminum sec-butoxide, cerium isopropoxide, hafnium tert-butoxide, magnesium aluminum isopropoxide, yttrium isopropoxide, zirconium isopropoxide, and the like. For low temperature applications, the preferred aerogels are prepared from silica, magnesia, and mixtures thereof.

Properties, especially the morphology, of the resulting aerogels and aerogel/fiber matrix composites are strongly affected by the pH of the precursor solution. Solution pH affects the processing of aerogels, primarily by controlling the rate of the hydrolysis and condensation reactions. For low temperature aerogels under acidic conditions, hydrolysis of the low temperature aerogel precursors is generally rapid and a burst of metal hydroxide containing monomers is produced which monomers slowly condense by cluster—cluster growth to form a cross-linked gel during the drying. Under basic conditions, the condensation reaction is faster than the hydrolysis reaction and can quickly consume newly generated monomers unless controlled. In this case, the gelation proceeds through monomer-cluster growth mechanism. Therefore, in general, especially for low temperature silica aerogels and when flexibility is an important issue, the composite insulations are prepared under neutral to slightly basic conditions, i.e. pH of about 7–9, and when flexibility is less desired, more acidic conditions, e.g. pH of about 1–5, may be employed.

For high temperature aerogel products, e.g. zirconia or yttria aerogel/fiber matrix composite insulation processing, solubility of the metal alkoxides and by-products from the hydrolysis reaction in the solvent is an important issue. If the concentration of the alkoxides or by-products is greater than the solubility limit, they will be precipitated out and will not enter into the condensation reaction. In this case, the precipitation can be effectively prevented by reducing the pH of the system by adding a small amount of an organic acid such as acetic acid or a metallic acid such as HCl to the solvent. While the amount of acid required to avoid precipitation is a function of reaction conditions, the specific metal alkoxide, and the specific acid used, generally an acid concentration between about 0.2–1.2 volume percent has been found adequate. Reducing the pH for high temperature aerogel precursors prevents the precipitation and also suppresses the condensation reaction.

The molar ratios of the reactants, i.e. the metal alkoxide, water, and solvent, also affect the properties of the resulting aerogels and the aerogel/fiber matrix composite insulation. The thermal performance of the superinsulation strongly depends upon the aerogel loading density which, in turn, is determined by the molar ratios of the reactants, i.e. the metal alkoxide, water, and solvent, and the pH of the precursor solution.

Generally, the solvent will be a lower alcohol, i.e. an alcohol having 1 to 6 carbon atoms, preferably 2 to 4, although other liquids can be used as is known in the art.

In general, a higher alkoxide to solvent ratio (higher alkoxide concentration) results in a higher loading of aerogel in the fiber matrix and as the aerogel loading increases so does the rigidity of the resulting composite superinsulation. For example, an aerogel-fiber mixture having a tetraethoxysilane:water:ethanol (TEOS:H$_2$O:EtOH) ratio of 1:3:4 was so rigid and brittle that it broke upon removal from the autoclave while a lower loaded silica aerogel-fiber mixture having a ratio of 1:3:8 prepared at the same acidic pH was flexible. Similarly, a silica insulation having a ratio of 1:4:4 was rigid as was the product made from a 1:3:4 ratio but it was not brittle. When the pH of the system is increased for a low temperature aerogel insulation, the flexibility has been found to increase. When the low temperature insulations were prepared under basic conditions, i.e. pH above 7, they were always flexible. For example, insulations prepared from TEOS:water:ethanol ratios of both 1:3:8 and 1:3:12 are both very flexible when prepared at pH 8. Similarly, the insulation having a ratio of 1:3:4 is more rigid than one having a ratio of 1:4:4.

For silica aerogel-containing low temperature insulations the currently preferred ingredients are tetraethoxysilane (TEOS), water, and ethanol (EtOH) and the preferred ratio of TEOS to water is about 0.2–0.5:1, the preferred ratio of TEOS to EtOH is about 0.02–0.5:1, and the preferred pH is about 2 to 9. The natural pH of a solution of the ingredients is about 5. While any acid may be used to obtain a lower pH solution to increase rigidity, HCl is the currently preferred acid. To obtain a higher pH and increased flexibility of the low temperature insulations, NH$_4$OH is the preferred base.

Accordingly, after selection of the fibrous matrix and the aerogel to be used with it, a suitable metal alkoxide-alcohol solution is prepared. While techniques for preparing specific solutions are described below, the preparation of others are well known in the art. (See, for example, S. J. Teichner et al., "Inorganic Oxide Aerogel," Advances in Colloid and Interface Science, Vol. 5, 1976, pp 245–273, and L. D. LeMay, et al., "Low-Density Microcellular Materials," MRS Bulletin, Vol. 15, 1990, p 19). Suitable materials for use in forming the aerogel products useful at low temperatures are the non-refractory metal alkoxides based on oxideforming metals. Preferred such metals are silicon and magnesium as well as mixtures thereof. For higher temperature applications, suitable alkoxides are refractory metal alkoxides which will form oxides such as zirconia, yttria, hafnia, alumina, titania, ceria, and the like, as well as mixtures thereof such as zirconia and yttria. Mixtures of non-refractory with refractory metals, such as silicon and/or magnesium with aluminum, may also be used.

While a single alkoxide-alcohol solution is generally used, a combination of two or more alkoxide-alcohol solations may be used to fabricate mixed oxide aerogels. Examples of some preferred alkoxide and alcohol combinations for the preferred refractory metal oxide aerogels are listed in Table II.

TABLE II

ALKOXIDE/ALCOHOL COMBINATIONS PRODUCE REFRACTORY AEROGELS

| AEROGEL | ALKOXIDE | ALCOHOL |
|---|---|---|
| Zirconia | Zirconium isopropoxide | Isopropanol |
| 10% Yttria + 90% Zirconia | Zirconium isopropoxide + Yttrium isopropoxide | Isopropanol |
| Hafnia | Hafnium t-butoxide | n-Butanol |

After formation of the alkoxide-alcohol solution, water is added to cause hydrolysis so a metal hydroxide in a "sol"

state is present. The hydrolysis reaction, using tetraethoxysilane as an example, is:

$$Si(OC_2H_5)_4 + 4H_2O \rightarrow Si(OH)_4 + 4(C_2H_5OH) \qquad (1)$$

In prior art aerogel powder processing, this sol state alkoxide solution was simply condensed to produce a partially "condensed gel" precursor. In prior art aerogel monolith processing, this sol state alkoxide solution was added to fibers and the mixture aged for a sufficiently long period that gelation was completed before the gel was then subjected to supercritical drying conditions. For the composite insulations of this invention, the fibrous matrix is first thoroughly soaked with this "sol" state metal alkoxide solution so that the liquid phase surrounds each fiber in the fibrous matrix. After the soaking is completed, the condensation process, as shown in Eq. 2:

$$Si(OH)_4 \rightarrow SiO_2 + 2H_2O \qquad (2)$$

is caused to occur to form precursors which after supercritical drying become aerogels. The time required for the condensation reaction is primarily a function of the solution pH and temperature. Once the condensation reaction is begun and prior to aging, the impregnated fibrous matrix is placed in an autoclave and subjected to supercritical drying conditions.

In lieu of performing the hydrolysis, impregnation, condensation, and supercritical drying steps in the sequence described generally above, the fibrous matrix may be placed in an autoclave, the aerogel-forming components (metal alkoxide, water and solvent) added thereto, and the supercritical drying then immediately commenced. Supercritical drying is achieved by heating the autoclave to temperatures above the critical point of the solvent under pressure, e.g. 260° C. and more than 1,000 psi for ethanol.

After a dwell period (commonly about 1–2 hours), the autoclave is depressurized to the atmosphere in a controlled manner, generally at a rate of about 5 to 50, preferably about 10 to 25, psi/min. Due to this controlled depressurization there is no meniscus in the supercritical liquid and no damaging capillary forces are present during the drying or retreating of the liquid phase. As a result, the solvent (liquid phase) (alcohol) is extracted (dried) from the pores without collapsing the fine pore structure of the aerogels, thereby leading to the enhanced thermal performance characteristics.

The performance of a composite insulation can oftentimes be improved by incorporating one or more coatings onto the fibrous matrix prior to the matrix being soaked with the aerogel precursor solution. The absorption coefficient of many of the aerogels is extremely low for wave lengths shorter than about 8 μm and a large amount of infrared radiation (IR) can be easily transmitted through an aerogel. It is believed that the IR transmission is detrimental to the thermal performance of the insulation due to radiative heat transfer, and it further believed that radiative heat transfer may be the dominant mechanism for heat transfer in ultralow density aerogel-based materials.

The configuration of the superinsulation of this invention allows for the incorporation of a coating to improve the overall insulation performance by enhancing the attraction to the fibers and at times also by reducing the thermal conductivity of the resulting structures. A suitable such coating which may be obtained by precoating a fibrous matrix with a material which is IR opaque. Alternatively, the coating may be IR reflective.

Most preferably the radiation opaque material is a molecular sieve carbon (MSC) which is characterized by having a high surface area (about 50 to about 1,000 m$^2$/g or more) and an ultra fine pore size (often less than 1 nm). Molecular sieve carbon is very light and, by nature, highly absorptive. By forming molecular sieve carbon on the fibers within the fibrous matrix, it is believed that the transmission of IR emitted from a warm surface can be prevented. The molecular sieve carbon has also been found helpful in maintaining a high vacuum state by absorbing gas molecules.

A preferred technique for coating the surfaces of the fibers of the fibrous matrix with molecular sieve carbon entails first coating the fibers with a solution of an organic polymer which will depolymerize and revert to its monomeric form when heated to high temperatures (carbonization) in an inert atmosphere. The chemical structure of the polymer precursor is important in determining the nature of the carbonization process that will take place. The thermal reactivity of an organic molecule depends on such factors as its size, degree of free radical formation, and the presence of substituents or aromatic rings. Depending upon the structure of the polymer, these intramolecular reactions generally consist of one of three types: (a) the chains degrade completely into small molecules which evolve into a form of gas leaving little or no carbon behind; (b) the carbon chains collapse to form aromatic lamellae and move into a plastic phase where the lamellae stack above each other; or (c) the carbon chains collapse with their neighbors but remain intact. Polymers or other compounds which exhibit type (c) behavior are used. Examples of suitable such polymers include polyvinylidene chloride, polyfurfuryl alcohol, polyacrylonitrile, resorcinol, polyvinyl fluoride, polyvinyl chloride, and copolymers thereof either with each other or with additional monomers. The currently preferred polymer is a random copolymer of polyvinylidene chloride (PVDC) with polyvinyl chloride (PVC) which gives a high carbon yield on pyrolysis. Such copolymers are commercially available under the tradename "Saran" from Dow Chemical Co. and these copolymers are readily soluble to the extent of about 20 wt % in tetrahydrofuran, a low boiling point solvent.

To deposit the molecular sieve carbon on the fibers of a fibrous matrix, the carbon source is dissolved in a low-boiling solvent, e.g. tetrahydrofuran, the fibrous matrix is soaked with the solution, allowed to air-dry to remove the solvent prior to pyrolysis, and then the coated matrix is heated to a sufficiently high temperature to pyrolize the polymer and form the molecular sieve carbon coating on the fibers. The heating should be performed at maximum temperatures below those at which complete closure of all pores can occur.

Generally, there are three distinctive stages involved in the pyrolysis of a polymer to produce a high surface area MSC. First is a precarbonization stage during the early stage of heating (up to about 250° C.) when the materials turn black with rapid weight loss and all loosely bonded molecules such as excess monomer or solvent are removed. Second is the carbonization stage which is another regime of rapid weight loss, typically at temperatures between about 300 and 700° C., where oxygen, nitrogen, chlorine, etc., as well as some hydrogen are removed. At the end of stage 2, the material contains approximately one hydrogen atom for every two carbon atoms. Third is the dehydrogenation stage at temperatures above about 700° C., when the hydrogen atoms are gradually eliminated and the density, hardness, and stiffness of the remaining carbon increases and the carbon enters a glassy state comprised of isotropic collections of stacked lamellae or carbon ribbons.

Although the properties of the final carbon products are determined by the process conditions in each stage of pyrolysis, the second, i.e. carbonization, stage has the strongest influence on the yield and the properties of the resulting carbon. The objective of the carbonization step is a product with a high carbon yield, high porosity, and a fine uniform pore size distribution.

In view of the chemical reactions that occur during pyrolysis, control of the temperature, heating rate, time at the pyrolysis temperature, and total gas pressure is used. Suitable temperatures for the preferred copolymer of polyvinylidene chloride and polyvinyl chloride are generally in the range of about 700 to less than 950° C., preferably about 750 to 850° C., since complete pore closure has been reported to occur at 950° C. and above. Suitable heating rates are generally about 0.2 to 5° C./minute, preferably about 0.5 to 2° C./minute. Suitable times at the pyrolysis temperature are generally in the range of about 1 to 4 hrs, preferably about 2 to 3 hr. Suitable total gas pressures are generally in the range of about 5 to 20 psig, preferably about 10 to 20 psig. The loading density of resulting molecular sieve carbon on the fibers of the fibrous matrix is not very critical since variations in the physical property of the molecular sieve carbon/fiber absorption layer have not been found to strongly affect the short term thermal performance of the integrated insulation systems because most carbon black has a very high absorption coefficient of about 95%. However, the long term performance of the insulation systems is believed influenced by the pore structure of the molecular sieve carbon, which determines the gas molecule absorption capability of the MSC. The rate of the degradation in vacuum, if any, is reduced by forming a MSC with high molecular absorption capability. Solutions containing from about 0.5 g polymer/100 g solvent up to the maximum solubility of the polymer in the solvent may be used.

It is believed that the IR transmission of a fibrous matrix may be reduced by coating the fibers of the matrix with a thin layer of a low emissivity metal. Silver, aluminum, copper, and gold are the preferred metals for use as radiation shields in the form of fiber coatings. Although any of the numerous published techniques known to deposit metal thin films on fibers may be used, most of them are line-of-sight processes in which portions of the fibers in the matrix are likely not to be coated by the metals. Preferably, a wet-chemical technique, such as sol-gel processing, or an electroless plating technique, are used to coat the fibers of the fibrous matrix. Since such processes are well known in the literature further details are not provided herein.

A conventional steady-state thermal conductivity measurement technique was found not suitable for evaluating the low temperature insulations of the present invention which have extremely low thermal conductivities (effective thermal conductivity k<<0.3 W/m° K.) under cryogenic conditions. Furthermore, the unique structure of the composite insulation products made it difficult to apply other standard test methods for thermal conductivity. Thus the apparatus and a new test procedure, called the "flash" method, used to determine the thermal conductivity of the cryogenic insulation products of this invention are described below.

Figure 2:
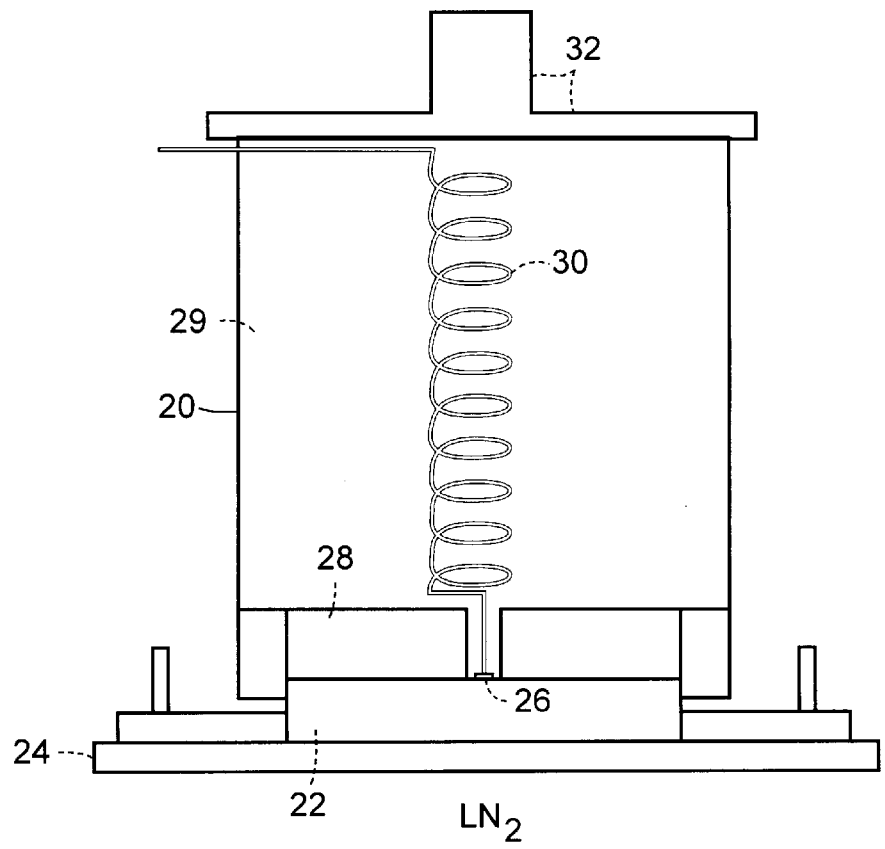
FIG. 2 is a schematic view of the low temperature thermal conductivity test sample assembly used herein.

As shown in FIG. 2, to use the test apparatus 20 a disk shaped aerogel-fibrous matrix composite sample 22 is loaded in the middle of a copper base plate 24 in a small vacuum taght chamber (not shown) (about 7.5" diameter by 8" long). A silicon diode temperature sensor 26 is placed at the center of the sample surface through a hole made from a top insulating block 28 of the aerogel/fiber matrix composite. A block of polyimide fiber 29 insulated coil copper wires 30 is stacked on top of the sample 22 and the entire structure is placed in position by slightly compressing it with a Teflon guide bar 32. The copper wires 30 (50" 1 long and 5 mil diameter) are embedded in the top insulating block 28 to minimize heat transfer from the side wall to the wires. The top lid (not shown) of the vacuum chamber is put into placed and tightened. For a vacuum seal at cryogenic temperatures, an indium wire O-ring (not shown) is used.

The test chamber with the sample in it is pumped down to a high vacuum of at least $2 \times 10^{-5}$ Torr and held in this vacuum for at least 30 minutes prior to testing to fully evacuate any gas molecules captured in the fine pore structured aerogels. The thermal conductivity of the sample is then measured in vacuum using a 280° K. warm surface temperature and a 77° K. cold surface temperature. For tests in alternative gas atmospheres, the test chamber is fully evacuated first followed by introduction of ultra high purity helium or nitrogen gas into the test chamber. The test chamber filled with gas is evacuated and filled with the test gas again. This procedure is repeated at least twice for each test. A gas pressure of about 1 to $500 \times 10^{-3}$ Torr is used and is controlled by adjusting values for the vacuum pumping speed and test gas feed rate, and monitored using a thermocouple guage. For an ambient gas pressure test, helium or nitrogen gas with an applied pressure of about 2 psi is introduced into the test chamber. The pressure of the gas is monitored by a digital pressure transducer and controlled by a pressure regulator.

The thermal conductivity of the sample is calculated from the transient temperature response (temperature-time relation) of the sample when one side of the sample is suddenly exposed to liquid nitrogen temperature by using the method described by P. J. Schneider (*Temperature Response Chart*, John Wiley and Sons, Inc., N.Y., 1963). The thermal conductivity of a material is related to its R value/inch by the equation: $R = 0.14423 \div \text{thermal conductivity}$, when the thermal conductivity is expressed in W/m° K.

In the following illustrative and non-limiting examples, all parts and percents are by weight unless otherwise specified.

EXAMPLE I

A series of low temperature aerogel composite superinsulations were prepared from silica aerogels and fiberglass pre-shaped fibrous matrices as follows:

Silica aerogel precursor solutions were prepared by mixing various concentrations of tetraethoxysilane (TEOS), water, and ethanol (EtOH). The acidity of the initially prepared TEOS/EtOH mixtures was pH 5 just after mixing, i.e. prior to any extensive hydrolysis and condensation reactions. Samples were also prepared at pH 2 and 8 by the addition of hydrochloric acid and ammonium hydroxide, respectively. After addition of water to the alkoxide-alcohol solution to cause hydrolysis, the fibrous matrices were fully soaked with the solutions so that the solutions covered all of the fibers. The soaked matrices were immediately loaded into a 1 litre capacity autoclave to perform supercritical drying and aerogel formation. The autoclave was purged with nitrogen and then heated to a maximum temperature of 300° C. During the heating, the pressure inside the autoclave increased to about 3,000 psig. After holding at these temperatures and pressures for 1 to 2 hours, the pressure of the autoclave was reduced over a period of 2 to 3 hours at a rate of 15 to 25 psi/minute by venting through a pressure relief valve while maintaining the temperature above the supercritical temperature of the ethanol (243° C.). When the pressure of the autoclave dropped to below 100 psig, the power for the autoclave heater was turned off and the remaining alcohol was bled out using nitrogen during cooling. The thermal performances of the composite superinsulations prepared using various alcogel chemistries and pH's were determined.

The apparent thermal conductivities of the composite superinsulations prepared with various stoichiometric ratios of TEOS:$H_2O$:EtOH of and at various pH's 5 in vacuum of less than $2 \times 10^{-5}$ Torr with a 280° K. warm surface temperature and a 77° K. cold surface temperature exhibited R values which ranged from 451 to 801, with the lowest aerogel loaded sample (1:4:22) exhibited a somewhat higher thermal conductivity than did those having higher loadings.

The results of the thermal conductivity measurements of the composite superinsulations prepared at various pH's are summarized in Table III below. Examination of all of the samples by scanning electron microscope indicated susbstantially no fiber—fiber contacts.

TABLE III

APPARENT THERMAL CONDUCTIVITIES (mW/m° K.) and R VALUES FOR INSULATION SAMPLES OF VARIOUS CHEMISTRIES AND pH'S, TESTED AT A VACUUM OF $<2 \times 10^{-5}$ USING A 280° K. WARM SURFACE TEMPERATURE AND A 77° K. COLD SURFACE TEMPERATURE

| STOICHIO-METRY TEOS:$H_2O$:EtOH | pH | THERMAL CONDUCTIVITY Vacuum $<2 \times 10^{-5}$ Torr | R VALUE/inch |
|---|---|---|---|
| 1:3:8 | 5 | 0.18 | 801 |
| 1:3:12 | 5 | 0.213 | 677 |
| 1:3:12 | 8 | 0.22 | 655 |
| 1:3:8 | 8 | 0.252 | 572 |
| 1:4:13 | 2 | 0.244 | 590 |
| 1:4:22 | 2 | 0.32 | 451 |
| 1:4:8 | 5 | 0.278 | 518 |
| 1:4:12 | 5 | 0.275 | 524 |

EXAMPLE II

A low temperature composite superinsulation was prepared from a silica aerogel and a fiberglass pre-shaped fibrous matrix having a molecular sieve carbon coating on the fibers as follows:

The fiberglass fibrous matrix was coated with molecular sieve carbon soaking the matrix with a solution of a copolymer of polyvinylidene chloride and polyvinyl chloride in tetrahydrofuran at 1 wt % solids. The fibrous matrix polymer precursor combination was air-dried overnight to remove much of the solvent prior to pyrolysis. The air-dried copolymer/fibrous matrix combination was heated in air at 250° C. for 12 hours to remove any remaining solvent and to eliminate about 70% of the chlorine as HCl. The specimen was then placed in a controlled gas atmosphere, purged with nitrogen for one hour, heated to a maximum temperature of 850° C. for two hours under flowing nitrogen, and furnace cooled.

Silica aerogels were formed within the molecular sieve carbon coated fiber matrices as in Example I.

The performance of these insulation products when tested as in Example I was:

| STOICHIO-METRY TEOS:H₂O:EtOH | pH | THERMAL CONDUCTIVITY $2 \times 10^{-5}$ Vacuum | R VALUE $2 \times 10^{-5}$ Vacuum |
|---|---|---|---|
| 1:3:12 | 2 | 0.224 | 667 |
| 1:3:12 | 5 | 0.224 | 667 |
| 1:4:22 | 2 | 0.337 | 428 |

While all of the insulation products exhibited enhanced attraction between the fibrous matrix and the aerogels formed therein as determined by visual inspection, only the insulation having the lowest loading (ratio 1:4:22) exhibited an improved R value, i.e. 667 vs. 451 for the non-pre-treated matrix.

EXAMPLE III

An IR reflective copper thin film was deposited on the fibers of a fibrous matrix using a conventional copper electroless plating industrial process (Shipley Cuposit 200 PTH process).

The procedure of Example I was then repeated preparing a series of silica aerogel-filled fibrous matrices within the copper coated fibrous matrix. The resulting insulations were evaluated in vacuum as in Example I and were found to have apparent thermal conductivities of 0.275–0.399 mW/m° K. in vacuum. The R values of these samples ranged from 360–524/inch in a vacuum of less than $2 \times 10^{-5}$ Torr using a warm surface temperature of 280° K. and a cold surface temperature of 77° K. Scanning electron microscopic examination did not reveal any fiber—fiber contacts.

EXAMPLE IV

Composite high temperature insulations containing 10–13% yttria and 90–87% zirconia aerogels deposited within a high temperature compatible alumina-based fiber matrix were prepared as in Example I, i.e. with no precoating of the fibers. Samples were produced within the ranges of ingredients listed in Table IV.

TABLE IV

YTTRIA-ZIRCONIA ALCOGEL CHEMISTRIES INVESTIGATED

| CONSTITUENT | MOLE RATIO RANGE |
|---|---|
| Zr(OR)₄ | 0.935–0.938 |
| Y(OR)₃ | 0.065–0.085 |
| H₂O | 1.5–2.0 |
| EtOH | 12–120 |
| NH₃ | 0.5–3 (cc) |
| HCl | 0.5–6 (cc) |

When the ratio of the total alkoxides to the ethanol solvent was low, i.e. less than 0.025, there was not enough aerogel in the resulting composite insulation. When the molar ratio of total alkoxides to the ethanol solvent was in the range between 0.025 and 0.067, good quality composite high temperature insulations were produced. The quality of these composite insulations depended strongly upon the pH of the system. At the natural system pH of 8 or higher, the quality of the resulting composite insulations and the aerogels themselves was poor. The poor quality is believed due to violent hydrolysis reactions of the alkoxides with the water whereby a large portion of the alkoxides were consumed by forming low surface area precipitates and the composite insulation had an inhomogenous distribution of aerogels and precipitates in the fiber matrix.

However, when an acid (HCl) was added to reduce the pH and render the system acidic, high quality high temperature aerogel/fiber composite insulations without the precipitates were formed. The composite insulations had a homogeneous aerogel distribution as determined by visual inspection at high aerogel loading. Refractory aerogel/fiber composite insulations were produced having HCl concentrations between 0.2 and 1.2 volume percent. The best quality sample was produced when the HCl concentration was approximately 0.4 volume percent.

Examination of the samples by scanning electron microscope identified no fiber—fiber contacts in the high temperature composite insulations.

Apparent thermal conductivities of the high temperature composite insulations were determined in a conventional manner in air at 500° C. for representative yttria-zirconia samples prepared at acidic pH's at elevated temperatures are summarized in Table V. For comparison purposes the thermal conductivity values of the fibrous materials alone are also provided in Table V.

TABLE V

PERFORMANCES OF VARIOUS SAMPLES IN AIR AT 500° C.

| SAMPLE DESCRIPTION | CONDUCTIVITY (W/m° K.) | R/in VALUE |
|---|---|---|
| Alumina matrix only | 0.12 | 1.2 |
| Zirconia/Yttria composite | 0.08 | 1.8 |
| Zirconia/Yttria composite | 0.08 | 1.8 |

The zirconiz/yttria aerogels thus increased the R value of the matrix alone by 50%.

EXAMPLE V

The procedure of Example IV is repeated to prepare composite insulations of yttria/zirconia aerogels with a variety of ceramic matrices, including SiC fiber matrix, alumina-silica (90–108 composition) felt, silica-alumina (60–40% composition) fiber blanket, and molecular sieve carbon coated versions of the fiber matrices. Similar lack of fiber—fiber contacts, reduced thermal conductivity, and enhanced R value results are obtained.

What is claimed is:

1. A process of preparing an improved aerogel-containing insulation product comprising the steps of:
    (a) dissolving a metal alkoxide in an organic solvent;
    (b) adding water to the metal alkoxide to cause hydrolysis and formation of an aerogel-forming precursor;
    (c) soaking a fibrous matrix having fiber—fiber contacts with the aerogel-forming precursor; and
    (d) supercritically drying the precursor at a pressure to form the aerogel-containing insulation product without aging of the soaked matrix and reducing the pressure at which the supercritical drying is performed;
    wherein the product contains aerogels distributed throughout the fibrous matrix and there are sufficiently few fiber—fiber contacts in the matrix that the R value is at least about 300/inch when tested at a vacuum of less than $2 \times 10^{-5}$ Torr with a hot surface temperature of 280° K. and a cold surface temperature of 77° K.

2. The process of claim 1, wherein the insulation product is flexible.

3. The process of claim 1, wherein the aerogel comprises a non-refractory metal oxide.

4. The process of claim 3, wherein the non-refractory metal oxide is selected from the group consisting of silica, magnesia, and mixtures thereof.

5. The process of claim 3, wherein the aerogel-forming sol has a natural pH of less than 7.

6. The process of claim 5, wherein an acid is added to the sol to reduce the pH prior to soaking the fibrous matrix.

7. The process of claim 5, wherein a base is added to the sol to increase the pH prior to soaking the fibrous matrix.

8. The process of claim 1, wherein the organic solvent is an alcohol having 1 to 6 carbon atoms.

9. The process of claim 8, wherein the alcohol has 2 to 4 carbon atoms.

10. The process of claim 1, wherein the aerogel comprises a refractory metal oxide.

11. The process of claim 8, wherein the refractory metal oxide is selected from the group consisting of zirconia, yttria, hafnia, ceria, magnesia, alumina, and mixtures thereof.

12. The process of claim 11, wherein the aerogel-forming precursor has a natural pH of greater than 7.

13. The process of claim 12, wherein an acid is added to the precursor to reduce the pH prior to soaking the fibrous matrix.

14. The process of claim 1, wherein the supercritical drying is performed in such a manner that no capillary forces are present during the drying.

15. The process of claim 1, wherein the supercritical drying is performed at an elevated pressure in an autoclave and the pressure is reduced after supercritical conditions are reached at a rate of about 5 to 50 psi/minute.

16. The process of claim 15, wherein the pressure is reduced at a rate of about 10 to 25 psi/minute.

17. The process of claim 1, wherein the fibrous matrix is coated with molecular sieve carbon prior to the soaking.

18. The process of claim 17, wherein the molecular sieve carbon is formed by carbonization of an organic polymer coating previously deposited upon the fibers.

19. The process of claim 18, wherein the organic polymer coating comprises a copolymer of a polyvinylidene halide and polyvinyl chloride in a solvent.

20. The process of claim 1, wherein the fibrous matrix is coated with a metal selected from the group consisting of silver, copper, gold and aluminum prior to soaking.

21. The process of claim 1, wherein the fibrous matrix has a bulk density of about 0.15 g/cc or less.

22. The process of claim 1, wherein gelation occurs by cluster—cluster growth to form cross-linked gels during the supercritical drying.

23. The process of claim 1, wherein the product has a thermal conductivity of less than about 8 milliwatts per meter per degree Kelvin at a temperature of 280° K.

24. The process of claim 1, wherein the product has an R value of more than 500/inch.

25. The process of claim 1, wherein the product has an R value of more than 600/inch.

* * * * *

UNITED STATES PATENT AND TRADEMARK OFFICE
CERTIFICATE OF CORRECTION

PATENT NO. : 6,068,882
DATED : May 30, 2000
INVENTOR(S) : Jaesoek Ryu

It is certified that error appears in the above-identified patent and that said Letters Patent is hereby corrected as shown below:

Column 1,
Line 9, please insert the following text:
-- STATEMENT REGARDING FEDERALLY SPONSORED RESEARCH
Funding for this invention was provided in part by the Government of the United States of America through Contract Nos. NAS10-11973 and NAS10-12112, by the National Aeronautics and Space Administration. The Government has certain rights in this invention. --

Signed and Sealed this

Fifth Day of July, 2005

JON W. DUDAS
*Director of the United States Patent and Trademark Office*